Patented May 11, 1926.

1,584,372

UNITED STATES PATENT OFFICE.

IVAN GUBELMANN AND ROBERT J. GOODRICH, OF SOUTH MILWAUKEE, WISCONSIN, ASSIGNORS TO THE NEWPORT COMPANY, OF CARROLLVILLE, WISCONSIN, A CORPORATION OF DELAWARE.

METHOD OF PURIFICATION AND ISOLATION OF ANTHRAQUINONE BETA SULPHONIC ACID.

No Drawing.   Application filed May 9, 1925.  Serial No. 29,236.

This invention relates to the purification and isolation of anthraquinone beta sulphonic acid, also known as anthraquinone 2 sulphonic acid, and more particularly to the purification and isolation of said acid from other products formed in the sulphonation of anthraquinone. The chemical formula for anthraquinone beta sulphonic acid is:

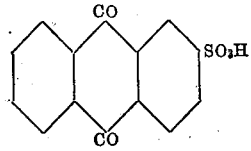

In the production of anthraquinone beta sulphonic acid, as by sulphonation of anthraquinone with sulphuric acid containing free anhydride, any impurities present in the anthraquinone used are subjected to the same treatment. Furthermore, during the sulphonation, certain isomeric sulphonic acids, together with certain di-sulphonic acids, may be formed. The method of purification of the anthraquinone beta sulphonic acid from these impurities has, in general, been by crystallizing out the sodium salt of anthraquinone beta sulphonic acid, known as "silver salt", from the water solution of the sulphonation mass. Further purification of the "silver salt" is generally necessary by re-crystallization.

We have found that the ammonium salt of anthraquinone beta sulphonic acid can be crystallized and isolated in an exceedingly high degree of purity from a water solution of anthraquinone beta sulphonic acid, or its salts, and accompanying impurities. The difference in water solubility under certain conditions of the ammonium salt of anthraquinone beta sulphonic acid and of its common impurities is such that a high degree of purity and an efficient separation of anthraquinone beta sulphonic acid may be accomplished in one treatment.
Furthermore, this method provides a cheap and rapid process for the production of pure anthraquinone beta sulphonic acid or its salts from the water soluble portion of the sulphonation mass. Different degrees of purification may also be effected by varying the conditions such as concentration of the water solution, temperature, and by adding water soluble salts, or in particular, soluble salts of ammonium.

The following example will serve to further illustrate the nature of our invention, but the invention is not limited to this example:

Pour the sulphonation mass, obtained by heating one part by weight of anthraquinone with one part by weight of sulphuric acid containing 40% of the free anhydride at 145° C. for two hours, into ten parts by weight of cold water. Filter off any unchanged anthraquinone and wash the filter cake with warm water until free of acid. Concentrate the combined filtrate and wash to 9° Baumé at 25° C. and add concentrated aqueous ammonia until slightly alkaline. Heat to 90° C., hold one hour, and cool slowly to 25° C. After standing for twelve hours, filter off the crystals of the ammonium salt of anthraquinone beta sulphonic acid and dry the crystals at 100° C.

We are aware that numerous details of the process may be varied through a wide range without departing from the spirit of this invention, and we do not desire limiting the patent granted other than as necessitated by the prior art.

We claim as our invention:

1. The method of purifying impure anthraquinone beta sulphonic acid and its salts which consists in converting said acid and salts into the ammonium salt of the acid and isolating the ammonium salt.

2. The method of purifying impure anthraquinone beta sulphonic acid, which consists in dissolving said acid in water, converting said acid into the ammonium salt and subsequently crystallizing out the ammonium salt of said acid.

3. The method of purification and isolation of anthraquinone beta sulphonic acid from the products of the sulphonation of anthraquinone, which consists in heating a water solution of the sulphonation mass with ammonia and allowing the ammonium salt of anthraquinone beta sulphonic acid to crystallize out.

4. The method of purifying and isolating the ammonium salt of anthraquinone beta sulphonic acid from water soluble impurities, which includes dissolving the ammonium salt and impurities in water and precipitating the ammonium salt of anthraquinone beta sulphonic acid by the addition of soluble ammonium salts.

5. The method of purifying and isolating the ammonium salt of anthraquinone beta sulphonic acid from water soluble impurities, which includes dissolving the ammonium salt and impurities in water and precipitating the ammonium salt of anthranone beta sulphonic acid by the addition of water soluble salts.

6. The method of purifying and isolating anthraquinone beta sulphonic acid from the water soluble products of the sulphonation of anthraquinone, which consists in treating a water solution of the sulphonation mass with concentrated aqueous ammonia until slightly alkaline, heating to approximately 90° C., cooling slowly to 25° C., allowing to stand until crystallization is substantially complete, and filtering off the crystallized ammonium salt of anthraquinone beta sulphonic acid.

In testimony whereof, we have hereunto subscribed our names.

IVAN GUBELMANN.
ROBERT J. GOODRICH.